(12) United States Patent
Torrione

(10) Patent No.: US 12,536,637 B2
(45) Date of Patent: Jan. 27, 2026

(54) SYSTEMS AND METHODS FOR DETERMINING IMAGE SUITABILITY FOR TRAINED MODELS

(71) Applicant: CoVar, LLC, Wilmington, DE (US)

(72) Inventor: Peter A Torrione, Wilmington, DE (US)

(73) Assignee: CoVar, LLC, Wilmington, DE (US)

( * ) Notice: Subject to any disclaimer, the term of this patent is extended or adjusted under 35 U.S.C. 154(b) by 396 days.

(21) Appl. No.: 18/226,378

(22) Filed: Jul. 26, 2023

(65) Prior Publication Data

US 2025/0037254 A1 Jan. 30, 2025

(51) Int. Cl.
| | |
|---|---|
| *G06T 7/00* | (2017.01) |
| *G06T 3/60* | (2024.01) |
| *G06T 7/11* | (2017.01) |
| *G06V 10/764* | (2022.01) |

(52) U.S. Cl.
CPC .............. *G06T 7/0002* (2013.01); *G06T 3/60* (2013.01); *G06T 7/11* (2017.01); *G06V 10/764* (2022.01); *G06T 2207/20084* (2013.01); *G06T 2207/30168* (2013.01)

(58) Field of Classification Search
CPC . G06T 7/0002; G06T 3/60; G06T 7/11; G06T 2207/20084; G06T 2207/30168; G06T 2207/20081; G06V 10/764; G06V 10/82
See application file for complete search history.

(56) References Cited

U.S. PATENT DOCUMENTS

| | | | |
|---|---|---|---|
| 8,532,434 B2* | 9/2013 | Morimoto ............. | G06V 30/414 |
| | | | 382/296 |
| 2015/0238148 A1* | 8/2015 | Georgescu .............. | G06F 18/28 |
| | | | 600/408 |
| 2018/0096224 A1* | 4/2018 | Fua ....................... | G06V 10/806 |
| 2020/0089985 A1* | 3/2020 | Wang ..................... | G06V 20/62 |
| 2023/0196642 A1* | 6/2023 | Hosseinzadeh Taher | ................... |
| | | | G06T 7/0012 |
| | | | 382/128 |
| 2025/0054273 A1* | 2/2025 | Williams ............... | G06V 10/44 |
| 2025/0139708 A1* | 5/2025 | Bouëtté .................. | G06V 10/26 |
| 2025/0156955 A1* | 5/2025 | Ramaswamy ......... | G06Q 40/08 |
| 2025/0182511 A1* | 6/2025 | Rimchala ......... | G06V 30/19147 |

\* cited by examiner

Primary Examiner — Wesley J Tucker

(74) Attorney, Agent, or Firm — HUNTON ANDREWS KURTH LLP

(57) ABSTRACT

The present embodiments are generally related to determining the suitability of one or more images for artificial intelligence models responsible for image recognition. The systems include image processors, servers, and databased. The image processor can receive images, split them into image chips, randomly rotate the image chips, and grade an AI model's estimation of the image chip rotation compared against its true rotation.

20 Claims, 5 Drawing Sheets

SYSTEMS AND METHODS FOR DETERMINING IMAGE SUITABILITY FOR TRAINED MODELS

FIELD OF THE DISCLOSURE

The present disclosure relates to determining whether an image is of good or bad quality regarding its use in an artificial intelligence (AI) or machine learning (ML) system.

BACKGROUND

There is a great need for AI/ML solutions to build trust with end-users. Trustworthy systems are those that can accurately determine when they cannot be relied upon and provide feedback to users when the data being ingested is not suitable for the intended purpose of the system. The specific technological problem highlighted is related to the impact of bad imagery on automatic target recognition. Bad imagery refers to images that are blurry, corrupt, or noisy. When an AI/ML system designed for target detection and recognition algorithms is presented with such bad data, it can lead to erratic behavior and unreliable results. This poses a challenge in ensuring the system's performance and maintaining user trust. These and other deficiencies exist. Therefore, there is a need to provide systems and methods that overcome these deficiencies.

SUMMARY OF THE DISCLOSURE

In some aspects, the techniques described herein relate to a method for assessing image quality including: receiving an input image; splitting the input image into one or more image chips; randomly rotating each of the image chips to point in one of a plurality of directions; passing the rotated image chips through one or more image detection models to estimate a direction of each image chip; evaluating the accuracy of the estimated direction by comparing it to the actual orientation of each image chip; calculating a percentage value representing the proportion of image chips correctly estimated by the image detection models; comparing said percentage value to a predetermined threshold value determined during training; and determining whether said input image is suitable for the image detection models based on said comparison.

In some aspects, the techniques described herein relate to a system for assessing image quality for use in artificial intelligence, including a processor configured to: receive an input image; split said input image into one or more image chips; randomly rotate each of the image chips to point in one of at least a plurality of directions; pass the rotated image chips through a trained network to estimate a direction of each image chip; evaluate the accuracy of the estimated direction by comparing it to the actual orientation of each image chip; calculate a percentage value representing the proportion of image chips correctly estimated by the trained network; compare said percentage value to a predetermined threshold value determined during training; and determine whether said input image is suitable for one or more image detection models based on said comparison.

In some aspects, the techniques described herein relate to a non-transitory computer readable medium containing computer executable instructions that, when executed by a device including a processor, configure the computer hardware arrangement to perform procedures including: receiving an input image; splitting the input image into one or more image chips; randomly rotating each of the image chips to point in one of at least a plurality of directions; passing the rotated image chips through a trained network to estimate a direction of each image chip; evaluating the accuracy of the estimated direction by comparing it to the actual orientation of each image chip; calculating a percentage value representing the proportion of image chips correctly estimated by the trained network; comparing said percentage value to a predetermined threshold value determined during training; and determining whether said input image is suitable for one or more image detection models based on said comparison.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
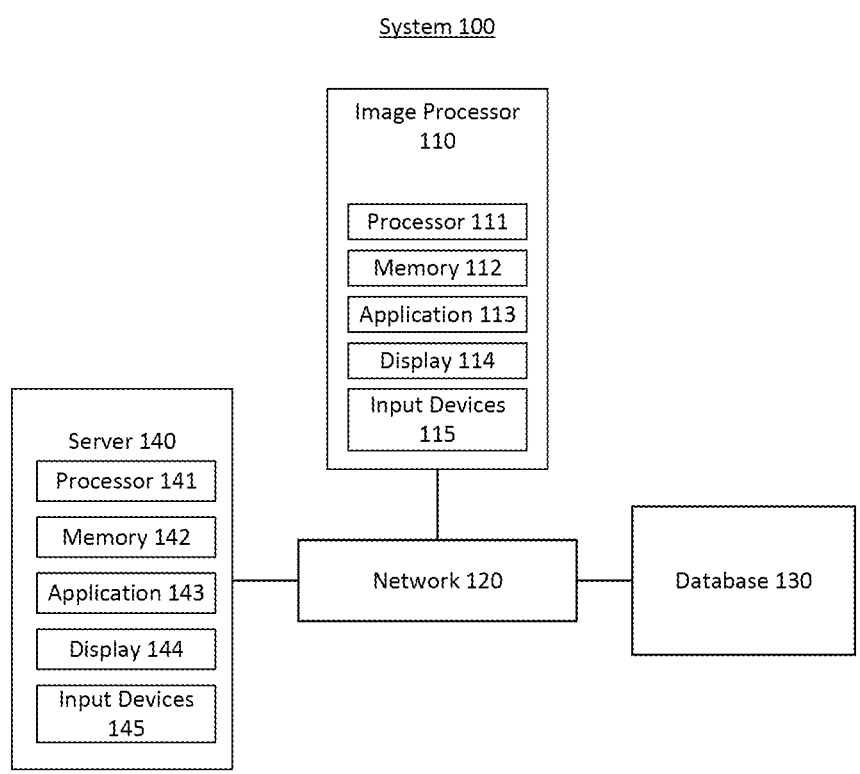
FIG. 1 illustrates a system according to an exemplary embodiment.

This invention describes a system that helps determine if an image is good or bad quality for use in an AI (Artificial Intelligence) or ML (Machine Learning) system. The goal is to build trust with users by alerting them when the data being used is not suitable for the intended purpose.

The present embodiments offer systems and methods that solve the following technological problem: Bad imagery, such as blurry or noisy images, can significantly reduce the accuracy of AI/ML systems. When the input data is of poor quality, it becomes challenging for the algorithms to extract meaningful features or patterns from the image. As a result, the system may struggle to correctly identify objects, recognize patterns, or make accurate predictions. Inconsistent or unreliable input data can lead to unpredictable outputs or inconsistent performance. The algorithms may struggle to handle unexpected variations or artifacts present in the bad imagery, resulting in inconsistent or incorrect results. Furthermore, processing bad imagery can be computationally intensive and time-consuming. AI/ML algorithms may require additional computational resources to compensate for the poor quality of the input data. For example, denoising or image enhancement techniques may need to be applied to improve the quality before further processing. This can lead to slower processing times and increased computational overhead. Additionally, bad imagery can contribute to an increased number of false positives or false negatives in the output of AI/ML systems. False positives occur when the system incorrectly identifies an object or attribute that is not present in the image. False negatives, on the other hand, happen when the system fails to detect or recognize an object or attribute that should be present. Bad imagery can make it challenging for the system to differentiate between noise and actual features, leading to higher error rates.

Finally, AI/ML systems trained on bad imagery may struggle to generalize well to unseen or different conditions. If the training data predominantly consists of bad imagery, the system may become biased towards those specific conditions and struggle to handle variations encountered in real-world scenarios. This can limit the system's ability to perform effectively in diverse or challenging environments.

As a solution to these problems, the invention offers this technological solution: systems and methods that effectively filters out bad images or bad data from an AI/ML system. Several improvements and benefits can be achieved for both end users and the technology itself. For example, filtering out bad images ensures that the AI/ML system receives only high-quality, reliable data for processing. This leads to improved accuracy in tasks such as object recognition, pattern detection, or prediction. By eliminating the negative impact of bad data, the system can make more reliable and precise decisions, benefiting the end user by providing more accurate results. Furthermore, removing bad images from the system reduces the computational burden associated with processing low-quality data. This can result in improved processing times and increased efficiency. With a streamlined input of good data, the AI/ML algorithms can focus on meaningful patterns and relevant features, leading to faster and more efficient processing. This benefit is particularly important in real-time applications or scenarios where quick responses are crucial. Also, filtering out bad data allows for better utilization of computing resources, such as processing power and memory. Since the system does not need to allocate resources to handle or correct the issues caused by bad data, it can allocate more resources to process high-quality data and perform more complex computations. This can lead to overall improved system performance and resource optimization. Regarding improvements to user experience, providing the end user with a system that filters out bad data and delivers reliable results builds trust and confidence in the technology. Users can rely on the system to make accurate predictions, detect objects correctly, or provide valuable insights without concerns about the impact of bad data. This, in turn, enhances user satisfaction and increases trust in the AI/ML system, making it more valuable and impactful in various domains. Finally, by implementing a robust filtering system, the technology becomes more resilient to variations in bad data. It can handle a wide range of image quality issues, such as blurriness, corruption, or noise, effectively improving its adaptability to different real-world scenarios. This robustness enables the AI/ML system to maintain its performance even when presented with challenging or suboptimal data, further boosting its reliability. Additionally, the system can alert the user to issues, problems, or deficiencies in the input data so that at the very least the user can approach the AI/ML systems with greater context. In summary, inventing a system and method that filters out bad images or bad data from an AI/ML system brings improvements in accuracy, efficiency, resource utilization, user trust, and robustness. It ensures that the system operates on high-quality data, leading to more accurate results, faster processing, optimized resource usage, increased user satisfaction, and improved performance in challenging conditions.

Exemplary embodiments of the invention will now be described in order to illustrate various features of the invention. The embodiments described herein are not intended to be limiting as to the scope of the invention, but rather are intended to provide examples of the components, use, and operation of the invention.

Furthermore, the described features, advantages, and characteristics of the embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system 100 according to an exemplary embodiment. The system 100 may comprise an image processor 110, a network 120, a database 130, and a server 140. Although FIG. 1 illustrates single instances of components of system 100, system 100 may include any number of components.

System 100 may include an image processor 110. The image processor 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows Mobile operating system, any device running Google's Android® operating system, and/or any other smartphone, tablet, or like wearable mobile device. A wearable smart device can include without limitation a smart watch.

The image processor 110 may include a processor 111, a memory 112, and an application 113. The processor 111 may be a processor, a microprocessor, or other processor, and the image processor 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the image processor 110 may include one or more of these memories. A read-only memory may be factory programmable as read-only or one-time programmable. One-time programmability provides the opportunity to write once then read many times. A write-once read-multiple memory may be programmed at one point in time. Once the memory is programmed, it may not be rewritten, but it may be read many times. A read/write memory may be programmed and re-programed many times after leaving the factory. It may also be read many times. The memory 112 may be configured to store one or more software applications, such as the application 113, and other data, such as user's private data and financial account information.

The application 113 may comprise one or more software applications, such as a mobile application and a web browser, comprising instructions for execution on the image processor 110. In some examples, the image processor 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described below. Such processes may be implemented in software, such as software modules, for execution by computers or other machines. The application 113 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The image processor 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the image processor 110 that is available and supported by the image processor 110, such as a touch-screen, keyboard, mouse, cursor-control device, touch-screen, microphone, digital camera, video recorder or camcorder. These devices may be used to enter information and interact with the software and other devices described herein.

System 100 may include one or more networks 120. In some examples, the network 120 may be one or more of a wireless network, a wired network or any combination of wireless network and wired network, and may be configured to connect the image processor 110, the server 140, and the database 130. For example, the network 120 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.1 In and 802.11g, Bluetooth, NFC, Radio Frequency Identification (RFID), Wi-Fi, and/or the like.

In addition, the network 120 may include, without limitation, telephone lines, fiber optics, IEEE Ethernet 902.3, a wide area network, a wireless personal area network, a LAN, or a global network such as the Internet. In addition, the network 120 may support an Internet network, a wireless communication network, a cellular network, or the like, or any combination thereof. The network 120 may further include one network, or any number of the exemplary types of networks mentioned above, operating as a stand-alone network or in cooperation with each other. The network 120 may utilize one or more protocols of one or more network elements to which they are communicatively coupled. The network 120 may translate to or from other protocols to one or more protocols of network devices. Although the network 120 is depicted as a single network, it should be appreciated that according to one or more examples, the network 120 may comprise a plurality of interconnected networks, such as, for example, the Internet, a service provider's network, a cable television network, corporate networks, such as credit card association networks, and home networks. The network 120 may further comprise, or be configured to create, one or more front channels, which may be publicly accessible and through which communications may be observable, and one or more secured back channels, which may not be publicly accessible and through which communications may not be observable.

System 100 may include a database 130. The database 130 may be one or more databases configured to store data, including without limitation, private data of users, financial accounts of users, identities of users, transactions of users, and certified and uncertified documents. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by the server 140 or may be hosted externally of the server 140, such as by a server, by a cloud-based platform, or in any storage device that is in data communication with the server 140.

The server 140 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 140 may include a processor 141, a memory 142, and an application 143. The processor 141 may be a processor, a microprocessor, or other processor, and the server 140 may include one or more of these processors. The server 140 can be onsite, offsite, standalone, networked, online, or offline.

The processor 141 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 141 may be coupled to the memory 142. The memory 142 may be a read-only memory, write-once read-multiple memory or read/write memory, e.g., RAM, ROM, and EEPROM, and the server 140 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 142 may be configured to store one or more software applications, such as the application 143, and other data, such as user's private data and financial account information.

The application 143 may comprise one or more software applications comprising instructions for execution on the server 140. In some examples, the server 140 may execute one or more applications, such as software applications, that enable, for example, network communications with one or more components of the system 100, transmit and/or receive data, and perform the functions described herein. Upon execution by the processor 141, the application 143 may provide the functions described in this specification, specifically to execute and perform the steps and functions in the process flows described below. Such processes may be implemented in software, such as software modules, for execution by computers or other machines. The application 143 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 140 may further include a display 144 and input devices 145. The display 144 may be any type of device for presenting visual information such as a computer monitor, a flat panel display, and a mobile device screen, including liquid crystal displays, light-emitting diode displays, plasma panels, and cathode ray tube displays. The input devices 145 may include a touch-screen, keyboard, mouse, cursor-control device, touch-screen, microphone, digital camera, video recorder or camcorder. These devices may be used to enter information and interact with the software and other devices described herein. The server may be a combination of one or more cloud computing systems such as public clouds, private clouds, and hybrid clouds.

Figure 2:
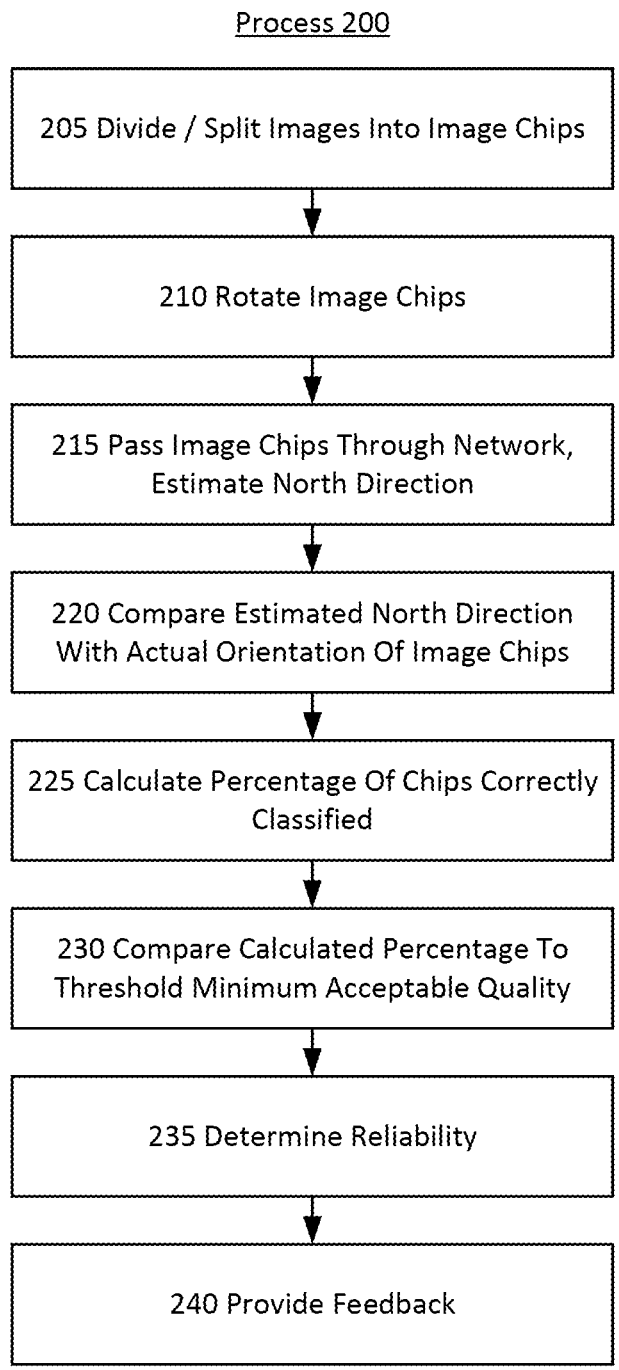
FIG. 2 is a flowchart illustrating a method according to an exemplary embodiment.

FIG. 2 is a method diagram illustrating a process 200 according to an exemplary embodiment. The method can include without limitation an image processor, network, database or data storage unit, and a server. These elements are discussed with further reference to FIG. 1. The processor described in the process 200 can be associated with the image processor and/or the server. A processor can receive one or more images. The one or more images can include one or more frames from a video. The images can be received in one-by-one, in batches, or continuously. The images can be received or a wired or wireless network discussed with further reference to FIG. 1. The images can be received from an image sensor or image capture device, including without limitation a camera as well as other devices associated with a camera including without limitation an inertial measurement unit (IMU). In some embodiments, the image processor can be associated with the camera itself. For example, the camera can further include an image processor which is the hardware component that performs various operations on the raw image data captured by the camera sensor. This can include tasks such as image enhancement, noise reduction, compression, and feature extraction. The camera can further include a memory which stores the processed image data and any other relevant data, such as metadata or image annotations. The camera can also include any control electronics which manage the camera's operation, including settings such as exposure time, aperture, and ISO sensitivity. The camera can further include any power source necessary to provide the energy needed to operate the camera.

Having received the images, the process in action 205 can divide or split the images into multiple image chips. Image splitting refers to the process of dividing a larger image into smaller sections or sub-images called "image chips." The purpose of image splitting is to break down a complex image into smaller, more manageable parts for further analysis or processing. During image splitting, the original image is divided into non-overlapping or overlapping regions, depending on the specific requirements or algorithms being used. Each region or image chip typically has a defined size, such as 16×16 pixels or 64×64 pixels, as mentioned in the provided invention disclosure. The splitting can be done using different approaches. It can be based on a predefined grid pattern, where the image is divided into a regular grid, and each chip corresponds to a specific grid cell. Alternatively, the splitting can be done randomly, where the chips are extracted from random positions within the image. There may also be a bias towards the center of the image, meaning that the extraction of chips is more likely to occur in the central area of the image. Input images are split into possibly overlapping image chips of between 16×16 and 64×64 pixel regions. These regions can be extracted from a grid, or at random (uniformly) from inside the image, or randomly from inside the image with some bias towards the center of the image. In some embodiments, the image chips may be overlapping, and in other embodiments they may be non-overlapping.

In action 210, the processor can rotate the image chips. Specifically, each image chip is randomly rotated to point in different directions. This is done to ensure that the system can identify images in various orientations. As a nonlimiting example, the resulting image chips are then randomly rotated in one of 2 (0-degrees, 180-degrees) or 4 (0-degrees, 90-degrees, 180-degrees, or 270-degrees) orientations so that image "North" (up) now points in one of two or four cardinal directions. A nonlimiting example of rotating image chips is discussed with further reference to FIG. 3A and FIG. 3B. In action 215, the processor can pass the image chips through an algorithm or network that has been trained to estimate the correct direction of the chip, e.g. the correct north direction of each chip. The algorithm can be without limitation an artificial intelligence (AI), machine learning (ML), or neural network associated algorithm such as a convolutional neural network (CNN).

This network can be based on different algorithms like deep learning approaches, transformer networks, or classical machine learning algorithms. The network is trained using images similar to what will be encountered in the real world. For example, if the system is used for vehicle classification, the network will be trained on images of vehicles. During training, the accuracy of the north-detection network is measured and used to set thresholds. As another nonlimiting example, each of these chips is presented to a network that has been trained to estimate the north direction given a randomly rotated chip. These networks can be standard CNN deep learning approaches (e.g., RESNET, VGG), transformer networks, or classical machine learning algorithms (e.g., feature descriptors and support vector machines or random forests). These networks should be trained on data like the data that is expected to be presented to the system in the field (e.g., to provide self-assessment for a vehicle classification AI/ML pipeline, the north-estimation networks should be trained on images of vehicles). During training, a histogram of the accuracy of the north-detection networks can be estimated on a validation set. By estimating the histogram of the accuracy of the north-detection networks during the training phase, the invention allows for setting thresholds based on the distribution of accuracy values. These thresholds are later used during the actual AI/ML processing to determine if an image is suitable or to alert users about the quality of the data.

A histogram of the accuracy of the north-detection networks can be estimated during the training phase. To estimate the histogram, a dataset of training images may be required. These training images should be representative of the data that the system is expected to encounter in real-world scenarios. For example, if the AI/ML system is designed for vehicle classification, the training dataset should include images of vehicles. The north-detection networks, such as CNN deep learning approaches or other machine learning algorithms, are trained using the training dataset. The networks learn to estimate the north direction of the image chips given their randomly rotated versions. The accuracy of the north-detection networks is evaluated during this training process. A separate subset of the training dataset, called the validation set, is used to evaluate the performance of the trained networks. The validation set consists of image chips with known true orientations. The trained networks estimate the north direction for each chip, and the accuracy of these estimates is compared against the actual orientations. For each image chip in the validation set, the accuracy of the north-detection network's estimation is determined. It measures how closely the estimated north direction matches the actual orientation of the chip. The accuracy can be calculated as the percentage of chips correctly classified.

In action 220, the system compares the output of the north-estimation network with the actual orientation of the image chips. This allows the system to calculate the percentage of chips that were correctly classified. For example, if 75% of the chips were correctly classified, the system knows that 75% of the image is of good quality. Note that the Self-Assessment system knows the true orientation of the chips presented to the north-estimation networks. Therefore, the outputs of the north-estimation network can be evaluated against the actual orientation of the image chips. Thus, in action 225 the processor can calculate the percentage of estimations were correct. In action 230, the processor compares the calculated percentage to a threshold minimum acceptable quality that may be predetermined or dynamically changed according to the needs of the system and/or user. The calculated percentage is compared to a threshold value that was determined during training. The threshold value represents the minimum acceptable quality. If the calculated percentage is above the threshold, the image is considered to be of high quality and suitable for AI/ML processing. If it's below the threshold, it indicates low quality, and the image may not be reliable for the AI/ML system. To determine whether an image is suitable for AI/ML processing, the output percent correct is compared to a threshold value, where the threshold value was determined from the histogram. For example, if during network training we found that 10% of image chips had %-correct values of 45% or less, at run time one can approximately exclude the worst 10% of images by comparing the output percent correct to 45%. If the value is greater than 45%, the image is in the highest 90% of quality images, so the AI/ML can be trusted, and the converse is true if the value is less than 45%. Based on these threshold determinations, in action 235 the processor can determine the reliability of the image in terms of suitability for the algorithm. Having determined the reliability of the images, in action 240 can generate feedback or some adjustment in response to the reliability determination. Specifically, the results of the self-assessment system are used to provide feedback and make adjustments in downstream processing. This could involve raising warnings about the image quality or the trustworthiness of the AI/ML system. In extreme cases, if the self-assessment metric is too low, the AI/ML pipeline may be disabled, or alternative backup systems can be used to prevent failures when dealing with bad data (e.g., simpler systems may be less likely to fail when presented with bad data).

Figure 3A:
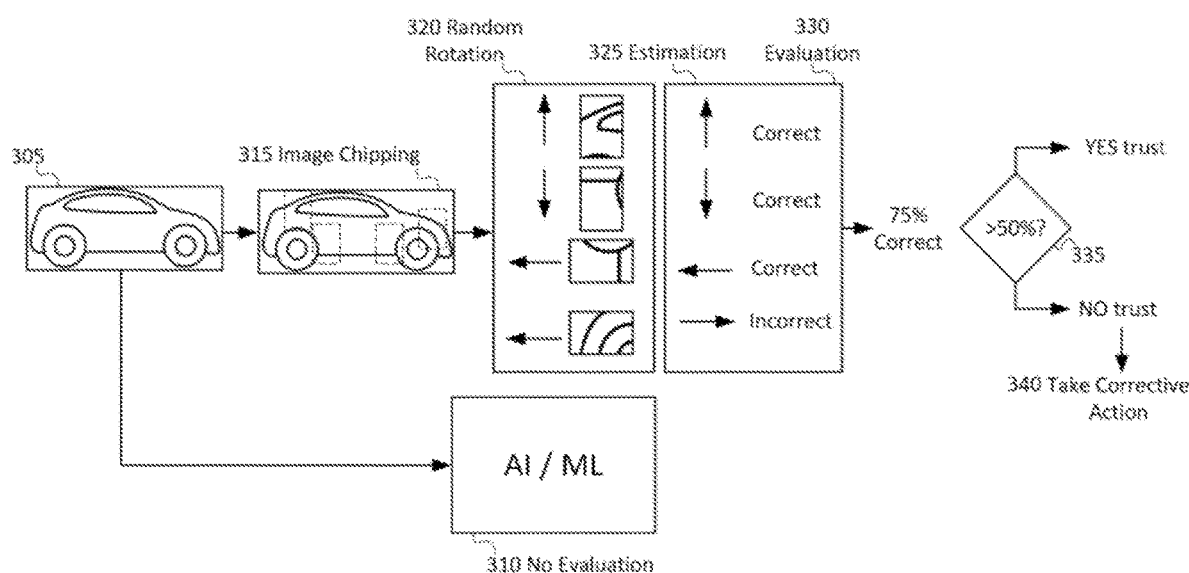
FIGS. 3A and 3B is a diagram illustrating a method according to an exemplary embodiment.
Figure 3B:
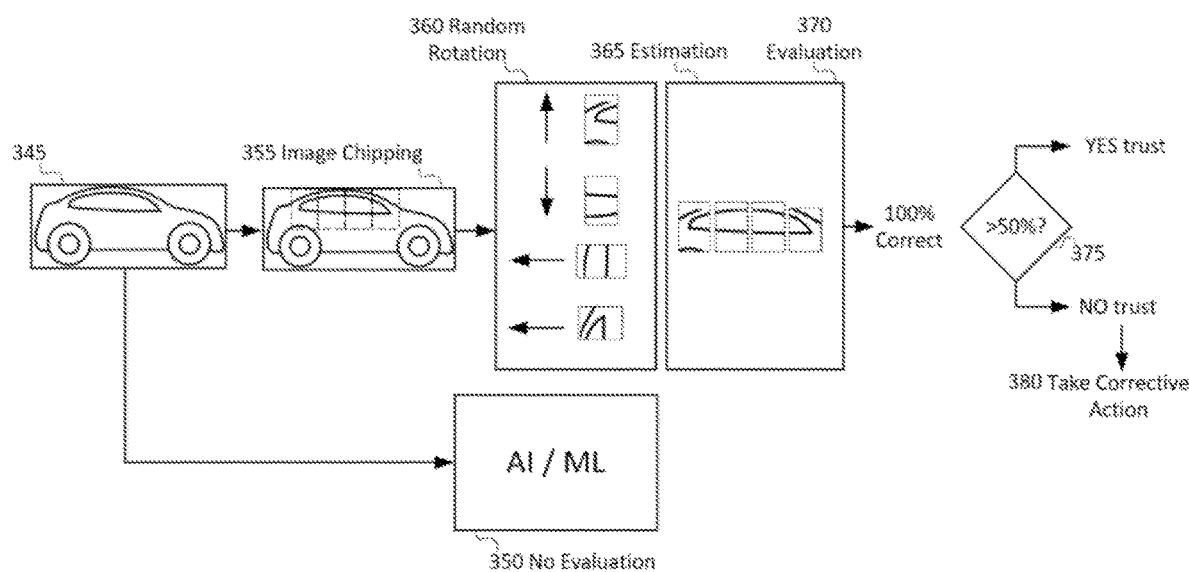

FIGS. 3A and 3B illustrate a process for determining image quality for use in an AI or ML setting. This process can be performed by an image processor, server, database, and network discussed with further reference to FIG. 1

Referring to FIG. 3A, in action 305 the processor receives or retrieves one or more images or image frames. The images can be received from a camera or some other image device. The images can be received in one-by-one, in batches, or continuously. The images can be received or a wired or wireless network discussed with further reference to FIG. 1. The images can be received from an image sensor or image capture device, including without limitation a camera as well as other devices associated with a camera including without limitation an inertial measurement unit (IMU). In some embodiments, the image processor can be associated with the camera itself. In conventional systems, the images in action 310 can be fed directly to the desired AI/ML model without any evaluation.

Having received the one or more images, the image processor can split the image into one or more image chips in action 315. Image splitting or image chipping is discussed with further reference to FIG. 2. In FIG. 3A, the image is split up into four image chips, each of which are nonoverlapping. It is understood that in some embodiments, the image chips can be overlapping. The chips in action 315 are all the same size, though in other embodiments the chips can be different sized and shaped. Having taken one or more image chips from an image, the processor in action 320 can randomly rotate each of the image chips, then in action 325 one or more algorithms can estimate what direction the chips are pointing. In action 330, the processor can evaluate whether the one or more algorithms correctly estimated the correct orientation of the chips. Based on the number of correct estimates, the processor in action 335 can whether or not to trust the images. If the processor determines that the image should not be trusted, in action 340 the processor can take corrective action such as adjust the display or some other action discussed with further reference to FIG. 4.

In FIG. 3A, it is shown that the algorithm is guessing which direction each chip has been rotated. It is understood that in other embodiments, such as FIG. 3B the algorithm can trained and configured to determine how the image chips fit back together after they have been rotated. That is, the algorithm can be configured to determine the relative location of one or more chips to one another. In FIG. 3B, actions 345 to 360 are largely the same as FIG. 3A actions 305 to

320. In action 345 the processor receives or retrieves one or more images or image frames. The images can be received from a camera or some other image device. The images can be received in one-by-one, in batches, or continuously. The images can be received or a wired or wireless network discussed with further reference to FIG. 1. The images can be received from an image sensor or image capture device, including without limitation a camera as well as other devices associated with a camera including without limitation an inertial measurement unit (IMU). In some embodiments, the image processor can be associated with the camera itself. In conventional systems, the images in action 350 can be fed directly to the desired AI/ML model without any evaluation.

Having received the one or more images, the image processor can split the image into one or more image chips in action 355. Image splitting or image chipping is discussed with further reference to FIG. 2. In FIG. 3B, the image is split up into four image chips, each of which are nonoverlapping. It is understood that in some embodiments, the image chips can be overlapping. The chips in action 355 are all the same size, though in other embodiments the chips can be different sized and shaped. Having taken one or more image chips from an image, the processor in action 360 can randomly rotate each of the image chips or otherwise put out of order. In action 365, the algorithm can guess how each of the chips fit together, such as in what order the chips should be and to what degree with chips line up with one another. In action 370, the processor can evaluate the accuracy of the algorithm's guess. For example, the processor can evaluate whether the algorithm has correctly placed the chips in order or how closely each of the images match up as compared to the actual orientation of the image chips. If the algorithm has placed the chips in an arrangement that closely matches the correct orientation of the images, then the processor will evaluate the image arrangements as being mostly correct represented as a percentage such as 75%, 90%, 100% or some range higher than 50%. If the processor determines that the algorithm could not place the image chips in a mostly correct orientation, then the processor will evaluate the image arrangement as being most incorrect, e.g. some percentage less than 50%. These aforementioned percentages are exemplary, and it is understood that in other embodiments other percentages may be used. Based on the number of correct estimates, the processor in action 375 can whether or not to trust the images. If the processor determines that the image should not be trusted, in action 380 the processor can take corrective action such as adjust the display or some other action discussed with further reference to FIG. 4.

Figure 4:
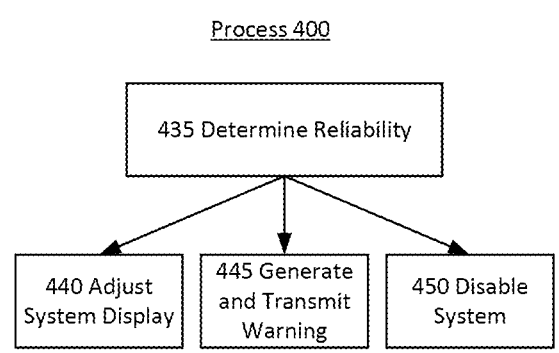
FIG. 4 is a flowchart illustrating a method according to an exemplary embodiment.

FIG. 4 is a flowchart illustrating a method according to an exemplary embodiment. Having determined the reliability of the images and determined that the images are not good candidates for the related AI/ML model, the image processor can take one or more corrective actions. In action 440, the processor can adjust the system display. If the self-assessment system identifies issues or detects a low-quality input, warnings about image quality can be raised. This alerts the end user about potential problems with the data, such as blurry, corrupt, or noisy imagery. In action 445, the processor can indicate that the AI/ML system's performance may be compromised or untrustworthy due to the input data quality, warnings about the trustworthiness of the system can be raised. This informs the user that the system's reliability may be affected and that the output should be interpreted with caution. The warning may be transmitted or displayed to the user via the image processor or some user device. The warning may be transmitted over a network as discussed with further reference to FIG. 1. In action 450, the processor can partially or completely disable the system responsible for the AI and ML models. For example, the AI/ML pipeline can be optionally disabled to prevent potentially unreliable or inaccurate results from being generated. Alternatively, backup systems, such as simpler systems that are less prone to failure with bad data, can be engaged to ensure the availability of a reliable alternative. By incorporating the self-assessment results into downstream processing, the invention allows for proactive adjustments and warnings related to image quality and the trustworthiness of the AI/ML system. This provides the end user with valuable feedback and allows them to make informed decisions based on the system's reliability. The optional actions further enhance the system's resilience and ensure that reliable results are obtained, even in the presence of bad data.

In some aspects, the techniques described herein relate to a method for assessing image quality including: receiving an input image; splitting the input image into one or more image chips; randomly rotating each of the image chips to point in one of a plurality of directions; passing the rotated image chips through one or more image classification models to estimate a direction of each image chip; evaluating the accuracy of the estimated direction by comparing it to an actual orientation of each image chip; calculating a percentage value representing the proportion of image chips correctly estimated by the image detection models; comparing said percentage value to a predetermined threshold value determined during training; and determining whether said input image is suitable for the image detection models based on said comparison.

In some aspects, the techniques described herein relate to a method, wherein the image detection models include at least a convolutional neural network.

In some aspects, the techniques described herein relate to a method, wherein the percentage value is 50%.

In some aspects, the techniques described herein relate to a method, wherein the method further includes providing feedback and adjusting downstream processing based on the determination of image suitability.

In some aspects, the techniques described herein relate to a method, wherein feedback includes adjusting a system display associated with the processor.

In some aspects, the techniques described herein relate to a method, wherein the method further includes generating a warning and transmitting the warning to a user.

In some aspects, the techniques described herein relate to a method, wherein the adjustment includes, upon determining that the image is not suitable, disabling the image detection networks.

In some aspects, the techniques described herein relate to a method, wherein a backup system is engaged.

In some aspects, the techniques described herein relate to a method, wherein the images include vehicles, human beings, and machinery.

In some aspects, the techniques described herein relate to a method, wherein at least four image chips are taken.

In some aspects, the techniques described herein relate to a system for assessing image quality for use in artificial intelligence, including: a processor configured to: receive an input image; split said input image into one or more image chips; randomly rotate each of the image chips to point in one of at least a plurality of directions; pass the rotated image chips through a trained network to estimate an orientation of each image chip; evaluate the accuracy of each of the estimated orientations by comparing each estimated orientation to the actual orientation of each image chip; calculate a percentage value representing the proportion of image chips correctly estimated by the trained network; compare said percentage value to a predetermined threshold value determined during training; and determine whether said input image is suitable for one or more image detection models based on said comparison.

In some aspects, the techniques described herein relate to a system, wherein the accuracy of the estimated orientations is further evaluated by comparing how each of the image chips are oriented in relationship to one another in estimation versus how each of the image chips are oriented in relationship to one another in actuality.

In some aspects, the techniques described herein relate to a system, wherein the orientation of the image chips includes one or more directions that each image chip is facing, and the processor is configured to evaluate the accuracy of each of the estimated direction orientations by comparing it each estimated direction to the actual direction of each image chip.

In some aspects, the techniques described herein relate to a system, wherein the processor is further configured to provide feedback or adjust downstream processing based on the determination of image suitability.

In some aspects, the techniques described herein relate to a system, wherein the feedback includes adjusting the system display.

In some aspects, the techniques described herein relate to a system, wherein feedback includes generating a warning and transmitting the warning to a user.

In some aspects, the techniques described herein relate to a system, wherein the processor is further configured to disable the one or more image detection models.

In some aspects, the techniques described herein relate to a system, wherein the one or more image detection models are convolutional neural networks.

In some aspects, the techniques described herein relate to a system, wherein upon determining that the input image is not suitable for the image detection models, the processor is configured to retrain the models.

In some aspects, the techniques described herein relate to a non-transitory computer readable medium containing computer executable instructions that, when executed by a device including a processor, configure the computer hardware arrangement to perform procedures including: receiving an input image; splitting the input image into one or more image chips; randomly rotating each of the image chips to point in one of at least a plurality of directions: passing the rotated image chips through a trained network to estimate a direction of each image chip; evaluating the accuracy of the estimated direction by comparing it to the actual orientation of each image chip; calculating a percentage value representing the proportion of image chips correctly estimated by the trained network: comparing said percentage value to a predetermined threshold value determined during training; and determining whether said input image is suitable for one or more image detection models based on said comparison.

The predictive models described herein can utilize a Bidirectional Encoder Representations from Transformers (BERT) models. BERT models utilize use multiple layers of so called "attention mechanisms" to process textual data and make predictions. These attention mechanisms effectively allow the BERT model to learn and assign more importance to words from the text input that are more important in making whatever inference is trying to be made.

The exemplary system, method and computer-readable medium can utilize various neural networks, such as convolutional neural networks (CNNs) or recurrent neural networks (RNNs), to generate the exemplary models. A CNN can include one or more convolutional layers (e.g., often with a subsampling step) and then followed by one or more fully connected layers as in a standard multilayer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks (LSTMs) and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The models described herein may be trained on one or more training datasets, each of which may comprise one or more types of data. In some examples, the training datasets may comprise previously-collected data, such as data collected from previous uses of the same type of systems described herein and data collected from different types of systems. In other examples, the training datasets may comprise continuously-collected data based on the current operation of the instant system and continuously-collected data from the operation of other systems. In some examples, the training dataset may include anticipated data, such as the anticipated future workloads, currently scheduled workloads, and planned future workloads, for the instant system and/or other systems. In other examples, the training datasets can include previous predictions for the instant system and other types of system, and may further include results data indicative of the accuracy of the previous predictions. In accordance with these examples, the predictive models described herein may be training prior to use and the training may continue with updated data sets that reflect additional information.

Further, it is to be understood that the terminology used herein is for the purpose of describing particular embodiments only and is not intended to be limiting. The terms "a" or "an" as used herein, are defined as one or more than one. The term "plurality" as used herein, is defined as two or more than two. The term "another" as used herein, is defined as at least a second or more. The terms "including" and/or "having," as used herein, are defined as comprising (i.e., open language).

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

The preceding description of exemplary embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

What is claimed is:

1. A method for assessing image quality comprising:
receiving an input image;
splitting the input image into one or more image chips;
randomly rotating each of the image chips to point in one of a plurality of directions;
passing the rotated image chips through one or more image classification models to estimate a direction of each image chip;
evaluating the accuracy of the estimated direction by comparing it to an actual orientation of each image chip;
calculating a percentage value representing the proportion of image chips correctly estimated by the image detection models;
comparing said percentage value to a predetermined threshold value determined during training; and
determining whether said input image is suitable for the image detection models based on said comparison.

2. The method of claim 1, wherein the image detection models comprise at least a convolutional neural network.

3. The method of claim 1, wherein the percentage value is 50%.

4. The method of claim 1, wherein the method further comprises providing feedback and adjusting downstream processing based on the determination of image suitability.

5. The method of claim 4, wherein feedback comprises adjusting a system display associated with the processor.

6. The method of claim 4, wherein the method further comprises generating a warning and transmitting the warning to a user.

7. The method of claim 4, wherein the adjustment includes, upon determining that the image is not suitable, disabling the image detection networks.

8. The method of claim 4, wherein a backup system is engaged.

9. The method of claim 1, wherein the images comprise vehicles, human beings, and machinery.

10. The method of claim 1, wherein at least four image chips are taken.

11. A system for assessing image quality for use in artificial intelligence, comprising:
a processor configured to:
receive an input image;
split said input image into one or more image chips;
randomly rotate each of the image chips to point in one of at least a plurality of directions;
pass the rotated image chips through a trained network to estimate an orientation of each image chip;
evaluate the accuracy of each of the estimated orientations by comparing each estimated orientation to the actual orientation of each image chip;
calculate a percentage value representing the proportion of image chips correctly estimated by the trained network;
compare said percentage value to a predetermined threshold value determined during training; and
determine whether said input image is suitable for one or more image detection models based on said comparison.

12. The system of claim 11, wherein the accuracy of the estimated orientations is further evaluated by comparing how each of the image chips are oriented in relationship to one another in estimation versus how each of the image chips are oriented in relationship to one another in actuality.

13. The system of claim 11, wherein the orientation of the image chips includes one or more directions that each image chip is facing, and the processor is configured to evaluate the accuracy of each of the estimated direction orientations by comparing it each estimated direction to the actual direction of each image chip.

14. The system of claim 11, wherein the processor is further configured to provide feedback or adjust downstream processing based on the determination of image suitability.

15. The system of claim 14, wherein the feedback comprises adjusting the system display.

16. The system of claim 15, wherein feedback comprises generating a warning and transmitting the warning to a user.

17. The system of claim 16, wherein the processor is further configured to disable the one or more image detection models.

18. The system of claim 11, wherein the one or more image detection models are convolutional neural networks.

19. The system of claim 18, wherein upon determining that the input image is not suitable for the image detection models, the processor is configured to retrain the models.

20. A non-transitory computer readable medium containing computer executable instructions that, when executed by a device comprising a processor, configure the computer hardware arrangement to perform procedures comprising:

receiving an input image;

splitting the input image into one or more image chips;

randomly rotating each of the image chips to point in one of at least a plurality of directions;

passing the rotated image chips through a trained network to estimate a direction of each image chip;

evaluating the accuracy of the estimated direction by comparing it to the actual orientation of each image chip;

calculating a percentage value representing the proportion of image chips correctly estimated by the trained network;

comparing said percentage value to a predetermined threshold value determined during training; and determining whether said input image is suitable for one or more image detection models based on said comparison.

* * * * *